(12) United States Patent
Shiota et al.

(10) Patent No.: US 12,319,228 B2
(45) Date of Patent: Jun. 3, 2025

(54) AUTOMOBILE ANTITHEFT DEVICE

(71) Applicant: TOYOTA JIDOSHA KABUSHIKI KAISHA, Aichi-ken (JP)

(72) Inventors: Atsushi Shiota, Toyota (JP); Yuuji Utou, Nagoya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 266 days.

(21) Appl. No.: 18/313,373

(22) Filed: May 8, 2023

(65) Prior Publication Data

US 2024/0017695 A1 Jan. 18, 2024

(30) Foreign Application Priority Data

Jul. 14, 2022 (JP) ................. 2022-113525

(51) Int. Cl.
| | |
|---|---|
| *B60N 2/12* | (2006.01) |
| *B60N 2/02* | (2006.01) |
| *B60N 2/06* | (2006.01) |
| *B60N 2/16* | (2006.01) |
| *B60N 2/20* | (2006.01) |
| *B60R 25/01* | (2013.01) |

(52) U.S. Cl.
CPC ........ *B60R 25/014* (2013.01); *B60N 2/02246* (2023.08); *B60N 2/06* (2013.01); *B60N 2/16* (2013.01); *B60N 2/20* (2013.01); *B60N 2/12* (2013.01)

(58) Field of Classification Search
CPC .......... B60R 25/014; B60N 2/06; B60N 2/16; B60N 2/20; B60N 2/02246; B60N 2/12
See application file for complete search history.

(56) References Cited

U.S. PATENT DOCUMENTS

| | | | | |
|---|---|---|---|---|
| 6,048,019 A | * | 4/2000 | Tauber ..................... | B60N 2/12 296/65.01 |
| 6,074,009 A | * | 6/2000 | Farino ..................... | B60N 2/20 70/261 |
| 6,746,071 B2 | * | 6/2004 | Farino ................... | B60R 25/014 70/261 |
| 6,942,273 B1 | * | 9/2005 | Jseng .................... | B60R 25/014 296/65.15 |

(Continued)

FOREIGN PATENT DOCUMENTS

| | | |
|---|---|---|
| JP | S6361664 A | 3/1988 |
| JP | 03088872 U | 9/1991 |

(Continued)

*Primary Examiner* — Syed A Islam
(74) *Attorney, Agent, or Firm* — HAUPTMAN HAM, LLP

(57) ABSTRACT

An automobile antitheft device is equipped with a seat frame installed between upper rails that are slidably supported by lower rails provided on a floor of a vehicle interior respectively, a seat cushion that is supported by the upper rails, that is configured to be able to rise and fall with respect to the upper rails, and that slides forward while falling when a cockpit is locked, and a seat back that is turnably supported by a back side of the seat cushion and that inclines forward when the cockpit is locked. A gap between a lower surface of the seat cushion and the seat frame is set as a gap that does not allow a connector provided below the seat cushion in front of the seat frame to be accessed from behind, when the cockpit is locked.

5 Claims, 4 Drawing Sheets

(56) References Cited

U.S. PATENT DOCUMENTS

| | | | |
|---|---|---|---|
| 7,025,419 B2* | 4/2006 | Sasaki | B60N 2/0825 |
| | | | 297/378.12 |
| 7,091,834 B2* | 8/2006 | Tanaka | B60R 25/014 |
| | | | 180/289 |
| 9,545,857 B2* | 1/2017 | Cooley | B60N 2/3065 |
| 10,493,868 B2* | 12/2019 | Ikeda | B60N 2/005 |
| 2021/0362625 A1* | 11/2021 | Golly | B60N 2/0244 |
| 2022/0348163 A1 | 11/2022 | Shiota et al. | |
| 2023/0398909 A1* | 12/2023 | Rajput | B60N 2/0881 |
| 2024/0075850 A1* | 3/2024 | Keum | B60N 2/1853 |
| 2024/0375558 A1* | 11/2024 | Balin | B60N 2/02246 |

FOREIGN PATENT DOCUMENTS

| | | |
|---|---|---|
| JP | H06206483 A | 7/1994 |
| JP | 2004082875 A | 3/2004 |
| JP | 2006123689 A | 5/2006 |
| JP | 2022171021 A | 11/2022 |

* cited by examiner

AUTOMOBILE ANTITHEFT DEVICE

CROSS-REFERENCE TO RELATED APPLICATION

This application claims priority to Japanese Patent Application No. 2022-113525 filed on Jul. 14, 2022, incorporated herein by reference in its entirety.

BACKGROUND

1. Technical Field

The disclosure relates to an automobile antitheft device.

2. Description of Related Art

An automobile antitheft device (a so-called cockpit lock device using a seat) having an actuator that is driven upon the lapse of a predetermined time after extracting an engine key to slide a seat cushion to a frontmost position and incline a seat back forward in an automobile power seat has been known conventionally (e.g., see Japanese Unexamined Utility Model Application Publication No. 03-088872 (JP 03-088872 U)).

SUMMARY

However, when the seat cushion is simply slid to the frontmost position and the seat back is simply inclined forward, there remains a gap of a certain size along a substantially vertical direction below a lower surface of the seat cushion, on a rear side of the seat cushion. Therefore, a connector of a memory ECU (a control device with a built-in memory that stores the position and the like of a seat in driving an automobile) provided below the seat cushion and a connector of a slide motor can be accessed from the gap.

The accessibility to the connector of the memory ECU and the connector of the slide motor makes it possible, for example, to drive the slide motor, because a power supply can be directly connected to each of the connectors. That is, the seat can be returned to an original position thereof (a position that allows the automobile to be driven). As described hitherto, it cannot be said that sufficient measures have been taken from the standpoint of preventing the automobile from being stolen, and there is still a room for improvement.

It is thus an object of the disclosure to obtain an automobile antitheft device that can more reliably prevent an automobile from being stolen.

In order to achieve the foregoing object, an automobile antitheft device of a first aspect according to the disclosure is equipped with a seat frame installed between a pair of right and left upper rails that are supported by a pair of right and left lower rails provided on a floor of a vehicle interior respectively, slidably in a longitudinal direction of a seat, a seat cushion that is supported by the upper rails, that is configured to be able to rise and fall with respect to the upper rails, and that slides forward with respect to the seat while falling when a cockpit is locked, and a seat back that is turnably supported by a back side of the seat cushion with respect to the seat, and that inclines forward when the cockpit is locked. A gap between a lower surface of the seat cushion and the seat frame is set as a gap that does not allow a connector that is provided below the seat cushion with respect to the seat in front of the seat frame with respect to the seat to be accessed from behind the seat, when the cockpit is locked.

According to the disclosure of the first aspect, the gap between the lower surface of the seat cushion and the seat frame is set as the gap that does not allow the connector that is provided below the seat cushion with respect to the seat in front of the seat frame with respect to the seat to be accessed from behind the seat, when the cockpit is locked. Accordingly, a thief who attempts to steal an automobile cannot attack the connector from behind the seat. In consequence, the automobile is more reliably prevented from being stolen.

Besides, an automobile antitheft device of a second aspect according to the disclosure is obtained by modifying the automobile antitheft device of the first aspect as follows. That is, the seat cushion slides to a frontmost position and falls to a lowermost position when the cockpit is locked.

According to the disclosure of the second aspect, the seat cushion slides to the frontmost position and falls to the lowermost position when the cockpit is locked. Accordingly, the gap between the lower surface of the seat cushion and the seat frame is smaller than in the case where the seat cushion neither slides to the frontmost position nor falls to the lowermost position when the cockpit is locked. In consequence, an attack against the connector from behind the seat is made impossible more reliably.

Besides, an automobile antitheft device of a third aspect according to the disclosure is obtained by modifying the automobile antitheft device of the second aspect as follows. That is, outer end portions of the seat cushion that has fallen to the lowermost position in a seat width direction overlap with outer sides of the lower rails in the seat width direction, respectively, in a lateral view.

According to the disclosure of the third aspect, the outer end portions of the seat cushion that has fallen to the lowermost position overlap with the outer sides of the lower rails in the seat width direction, respectively, in the lateral view. Accordingly, an attack against the connector from outside in the seat width direction is made impossible more reliably than in the case where lower surfaces of the outer end portions of the seat cushion that has fallen to the lowermost position in the seat width direction have only reached, for example, upper surfaces of the lower rails, respectively, in the lateral view.

Besides, an automobile antitheft device of a fourth aspect according to the disclosure is obtained by modifying the automobile antitheft device of any one of the first to third aspects as follows. That is, the gap is equal to or smaller than 40 mm.

According to the disclosure of the fourth aspect, the gap between the lower surface of the seat cushion and the seat frame is equal to or smaller than 40 mm. Accordingly, an attack against the connector from behind the seat is made impossible more reliably than in the case where the gap between the lower surface of the seat cushion and the seat frame is larger than 40 mm.

Besides, an automobile antitheft device of a fifth aspect according to the disclosure is obtained by modifying the automobile antitheft device of any one of the first to fourth aspects as follows. That is, the connector is at least one of a connector of a slide motor that slides the upper rails and a connector of a control device that stores a position of the seat cushion in driving an automobile.

According to the disclosure of the fifth aspect, the connector that is provided below the seat cushion with respect to the seat and in front of the seat frame with respect to the seat is at least one of the connector of the slide motor that slides the upper rails and the connector of the control device that stores the position of the seat cushion in driving the automobile. Accordingly, a thief who attempts to steal the automobile cannot return the seat to the original position thereof (a position that allows the automobile to be driven). In consequence, the automobile is more reliably prevented from being stolen.

As described above, the disclosure can more reliably prevent the automobile from being stolen.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
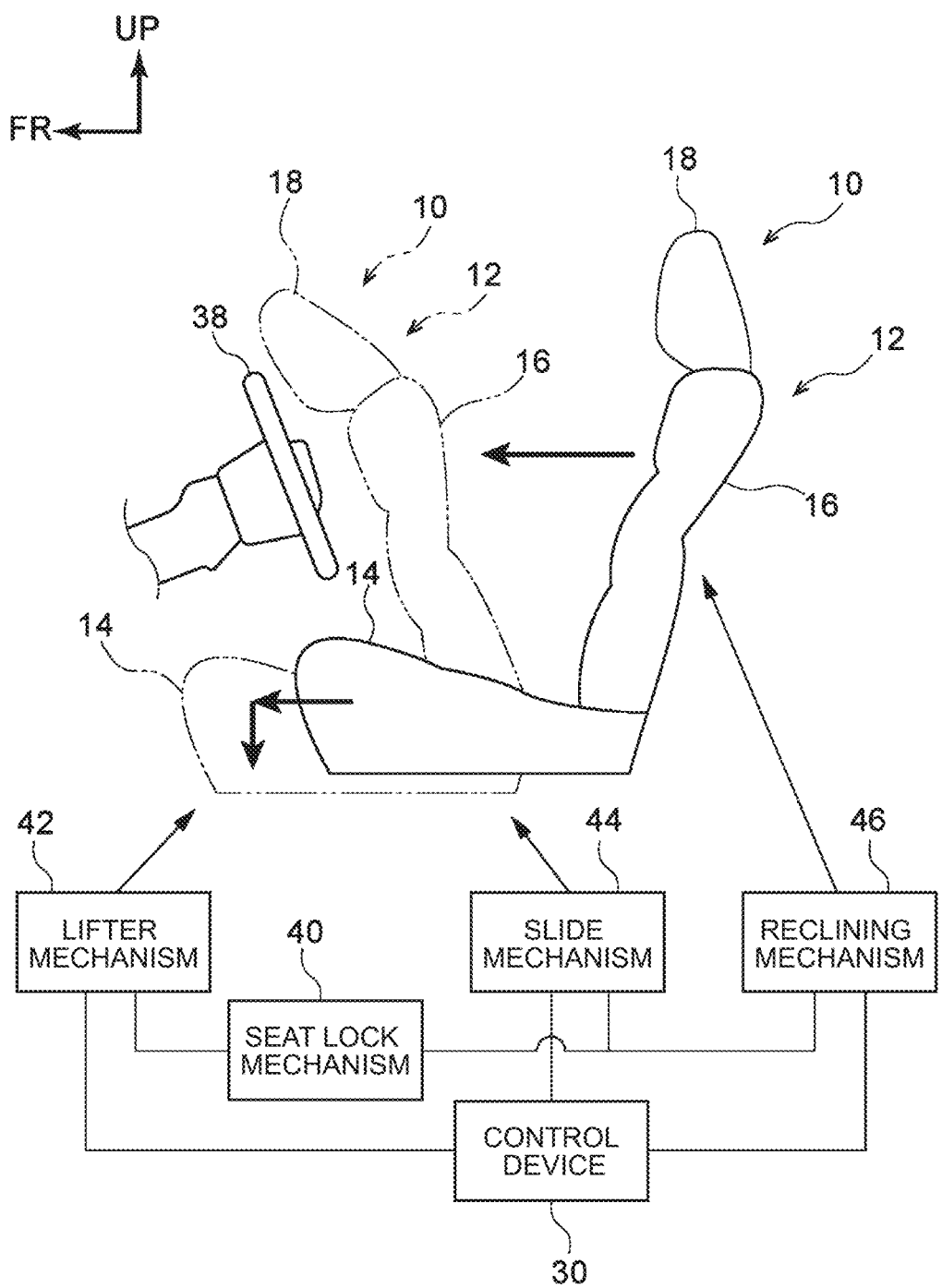
FIG. 1 is a schematic lateral view schematically showing how a seat constituting an automobile antitheft device according to one of the embodiments moves, as well as a control device and various mechanisms.

One of the embodiments according to the disclosure will be described hereinafter in detail based on the drawings. Incidentally, for the sake of convenience of explanation, arrows UP, FR, and RH that are depicted as appropriate in the drawings indicate an upward direction, a forward direction, and a rightward direction with respect to a seat, respectively. Accordingly, it is assumed that a vertical direction, a longitudinal direction, a lateral direction in the following description indicate a vertical direction, a longitudinal direction, and a lateral direction with respect to a power seat 12 as a driver seat that will be described later, respectively, unless otherwise specified. Besides, the lateral direction is synonymous with a seat width direction.

As shown in FIG. 1, an automobile antitheft device 10 according to the present embodiment is a so-called cockpit lock device that uses at least the power seat (hereinafter referred to simply as "the seat") 12 as the driver seat of an automobile (not shown). That is, the automobile antitheft device 10 locks the position and posture of the seat 12 as the driver seat such that nobody (no thief) can get into the automobile, and thus prevents the automobile from being stolen (enhances security).

As shown in FIG. 1, the seat 12 has a seat cushion 14 (see also FIGS. 2 to 4) on which a passenger (driver) is seated (which supports the hips and thighs of the passenger), a seat back 16 that supports the back of the passenger with a lower end portion of the seat back 16 turnably supported by a cylindrical member 15 (see FIG. 2) of which an axial direction coincides with the seat width direction behind the seat cushion 14, and a head rest 18 that is configured to be adjustable in height and that supports the head of the passenger.

Figure 3:
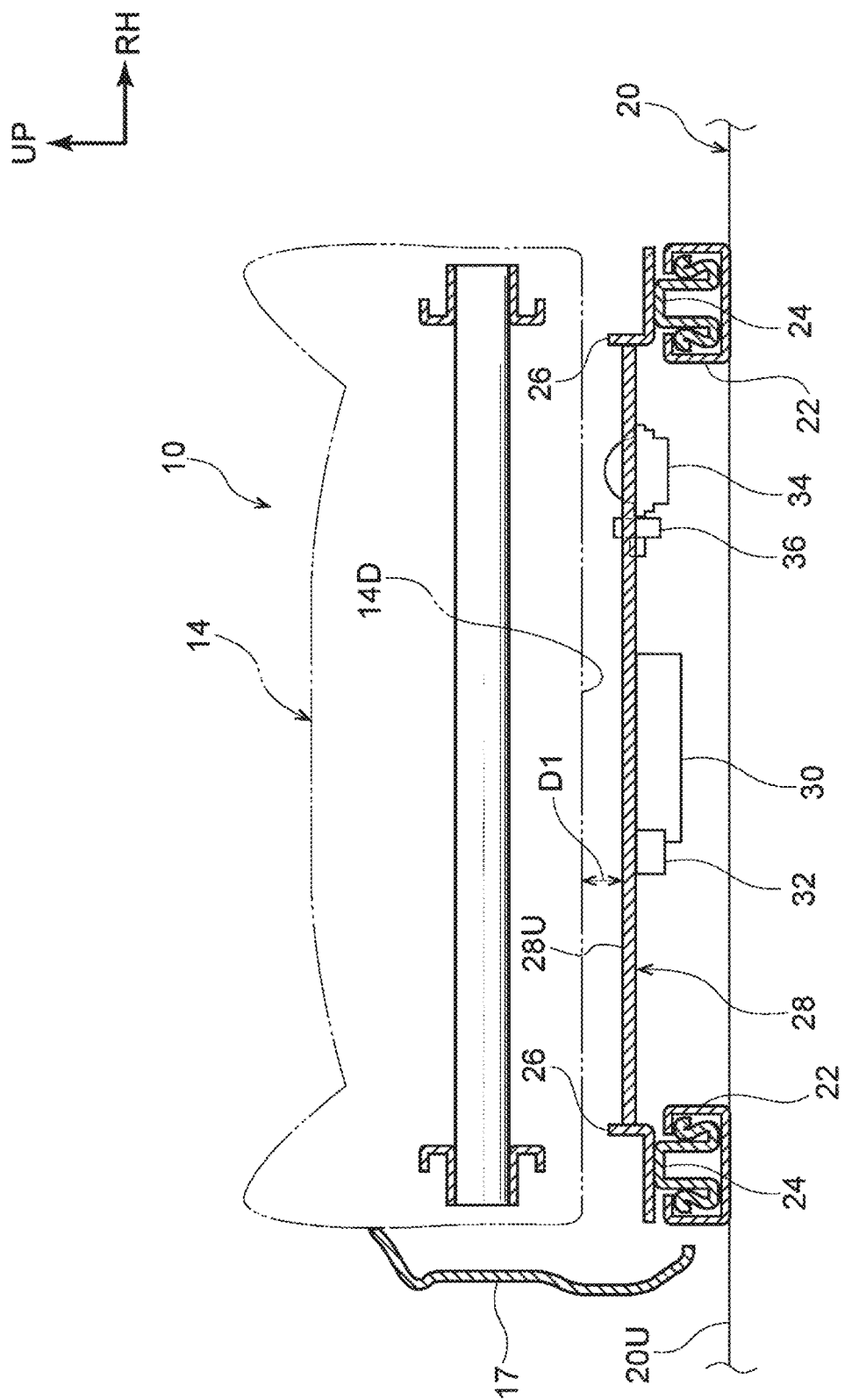
FIG. 3 is a schematic enlarged back view showing, partially in cross-section, the internal structure of the seat cushion constituting the automobile antitheft device according to the present embodiment.
Figure 4:
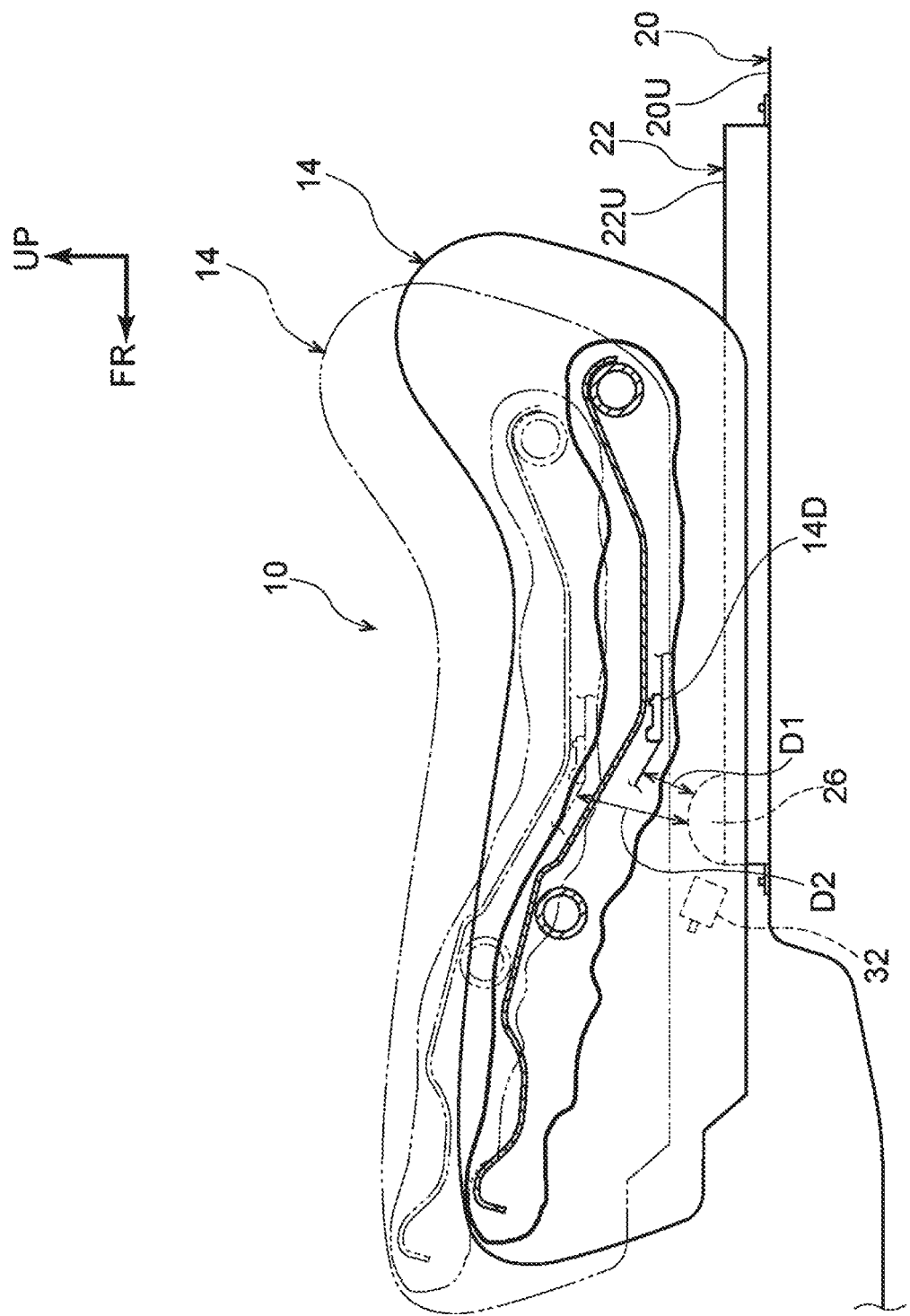
FIG. 4 is a schematic enlarged lateral view showing, partially in cross-section, the internal structure of the seat cushion constituting the automobile antitheft device according to the present embodiment.

As shown in FIGS. 3 and 4, a pair of right and left lower rails 22 that extend in the longitudinal direction are provided on a floor 20 of a vehicle interior in the automobile. The lower rails 22 support a pair of right and left upper rails 24 provided on both lower portions of the seat cushion 14 in the seat width direction, slidably in the longitudinal direction, respectively. Moreover, the upper rails 24 (the seat cushion 14) are configured to be slidable along the lower rails 22 respectively, by a known slide mechanism 44 (see FIG. 1).

Besides, the seat cushion 14 that is supported by the respective upper rails 24 is configured to be able to rise and fall with respect to the upper rails 24, by a known lifter mechanism 42 (see FIG. 1). Moreover, these longitudinal and vertical movements of the seat cushion 14, the inclination of the seat back 16 by a known reclining mechanism 46 (see FIG. 1), and the like are controlled (automatically carried out) by a known control device 30 (see FIG. 1) that will be described later.

Figure 2:
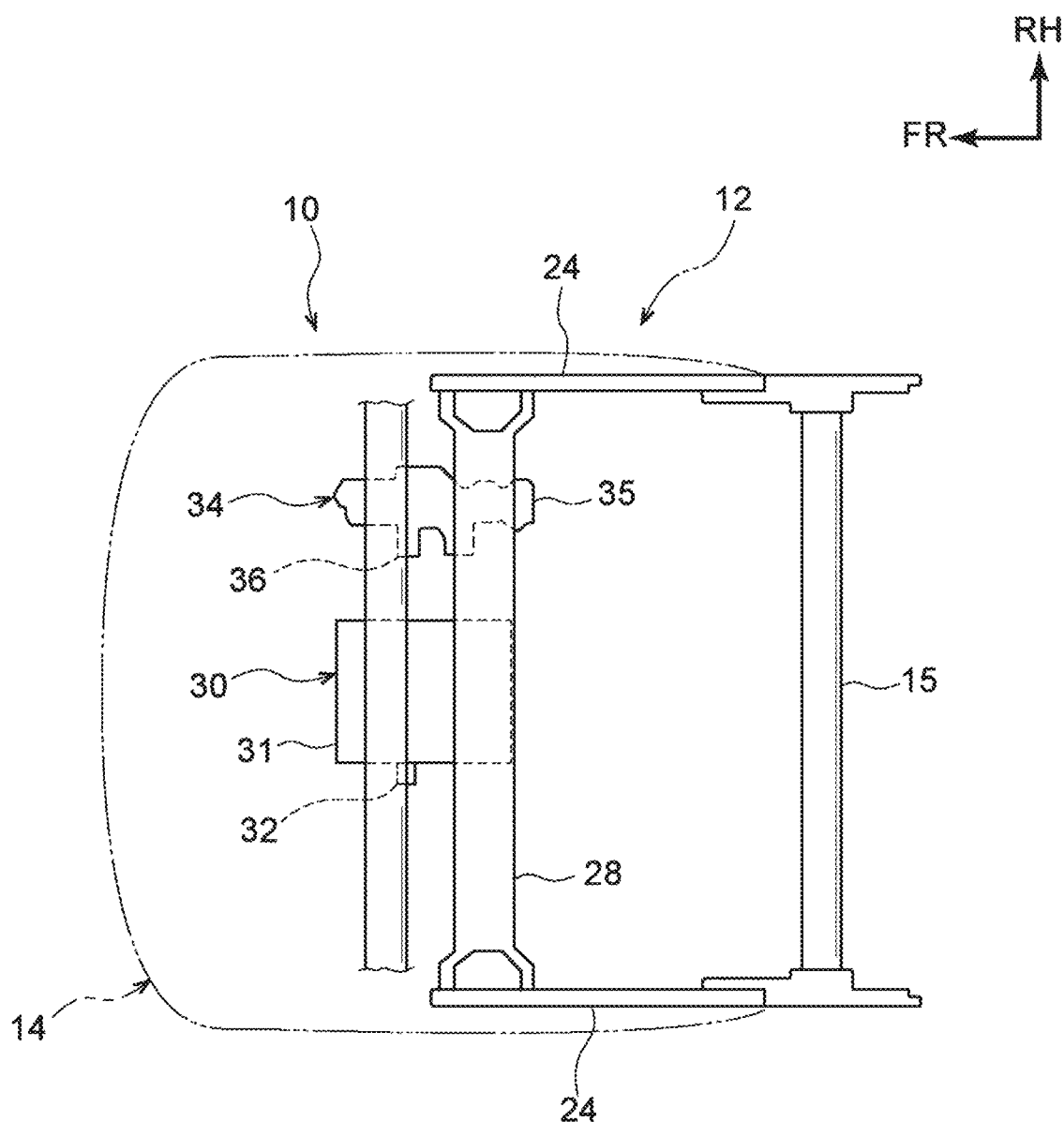
FIG. 2 is a schematic plan view showing the internal structure of a seat cushion constituting the automobile antitheft device according to the present embodiment.

As shown in FIG. 3 and FIG. 4, flat plate-shaped brackets 26 that are substantially semicircular in a lateral view and substantially in the shape of "L" in a back view (front view) are attached bilaterally symmetrically to upper portions of front ends of the upper rails 24 respectively. Besides, as shown in FIG. 2 and FIG. 3, a substantially flat plate-shaped seat frame 28 that extends in the seat width direction is installed between the right and left brackets 26. Incidentally, the brackets 26 are not depicted in FIG. 2.

Besides, as shown in FIGS. 2 to 4, the control device 30 having a connector 32, and a slide motor 34 having a connector 36 are provided in alignment in the seat width direction, below a front side of the seat cushion 14. As described above, the control device is an electronic control unit (ECU) that controls at least the longitudinal and vertical movements of the seat cushion 14 and the inclination of the seat back 16.

Moreover, the control device 30 has a built-in memory that stores at least the position of the seat cushion 14 and the posture (inclination position) of the seat back 16 in driving the automobile. Accordingly, in the case where, for example, a driver adjusts the position and posture of the seat 12 and issues instructions to store the position and posture of the seat 12, the memory stores the position and posture of the seat 12 as a set position. Incidentally, there may be a plurality of set positions.

Besides, the control device 30 is provided in a rectangular housing 31. The housing 31 is arranged on a central portion in the seat width direction on the front side of the seat cushion 14 in a plan view. Moreover, the connector 32 of the control device 30 is protruded outward in the seat width direction from one lateral surface (e.g., a left lateral surface) of the housing 31 for the control device 30. Incidentally, the connector 32 is arranged further forward than the seat frame 28 (see FIG. 1).

The slide motor 34 constituting the slide mechanism 44 is arranged adjacent to one side (the right side in the drawing) of the control device 30 in the seat width direction, on the front side of the seat cushion 14 in a plan view. By being driven, the slide motor 34 slides the upper rails 24 (the seat cushion 14) in the longitudinal direction along the lower rails 22 respectively.

Moreover, the connector 36 of the slide motor 34 is protruded inward in the seat width direction (toward the control device 30) from one lateral surface (e.g., a left lateral surface) of a housing 35 of the slide motor 34. Incidentally, as is the case with the connector 32, the connector 36 is also arranged further forward than the seat frame 28 (see FIG. 1).

The automobile antitheft device 10 (see FIG. 1) is configured to be actuated when a side door (not shown) on the driver seat side is locked through the operation of a smart key (not shown) that is a portable compact communication instrument possessed by the passenger (e.g., the driver), namely, when a cockpit is locked.

In concrete terms, when it is detected that the side door on the driver seat side is locked, the seat 12 performs a predetermined operation, for example, moves forward, and a known seat lock mechanism 40 (see FIG. 1) is actuated to lock the position and posture of the seat 12, through the control performed by the control device 30.

That is, the slide motor 34 (the slide mechanism 44) is driven to automatically slide the seat cushion 14 to a frontmost position, the lifter mechanism 42 is driven to lower the seat cushion 14 to a lowermost position, and the seat lock mechanism 40 locks the seat cushion 14 such that the seat cushion 14 remains at that position (the seat cushion 14 is lowered from a position indicated by a virtual line to a position indicated by a solid line and then locked at the position in FIG. 4).

The reclining mechanism 46 is then driven to automatically incline the seat back 16 forward to a most forward inclined position, and the seat lock mechanism 40 locks the seat back 16 such that the seat back 16 remains at that position (in that posture). Incidentally, the seat lock mechanism 40 may not necessarily be configured to have only an electric structure for forcibly shutting power supply, but may also be configured to include, for example, a mechanical lock mechanism that is actuated through power supply.

Besides, as shown in FIG. 1, a steering wheel 38 is provided in front of the seat 12 on the driver seat side. Accordingly, the automobile antitheft device 10 is configured such that an upper end portion of the seat back 16 and the head rest 18 are arranged close to the steering wheel 38, and that there is created a small gap between the steering wheel 38 and each of the upper end portion of the seat back 16 and the head rest 18 (the gap becomes so narrow that nobody can get into the automobile) when the cockpit is locked.

Incidentally, the steering wheel 38 may be configured to be movable in the longitudinal direction, and may be configured to be automatically moved backward such that the gap between the steering wheel 38 and each of the upper end portion of the seat back 16 and the head rest 18 becomes smaller (narrower) when the cockpit is locked.

Besides, as shown in FIG. 3, a resin shield 17 is provided outside the seat cushion 14 (outside a surface skin thereof) in the seat width direction. Moreover, as shown in FIG. 3 and FIG. 4, the shield 17 as an outer end portion of the seat cushion 14 that has fallen to the lowermost position in the seat width direction overlaps with an outer side of one of the lower rails 22 in the seat width direction in a lateral view.

In other words, when the seat cushion 14 falls to the lowermost position, a lower surface of the shield 17 as the outer end portion of the seat cushion 14 in the seat width direction is located lower than an upper surface 22U of the lower rail 22 (close to an upper surface 20U of the floor 20) in a back view and a lateral view. Incidentally, the shield 17 is configured to be provided only on the side door side of the seat cushion 14 and not on a center console side of the seat cushion 14 (because of the presence of the center console).

Besides, as shown in FIG. 3 and FIG. 4, a gap D1 along a substantially vertical direction between a lower surface 14D located lowest except the shield 17 as the outer end portion of the seat cushion 14 in the seat width direction (a region arranged outside the lower rail 22 in the seat width direction) and an upper surface 28U of the seat frame 28 is set as a gap (size) that does not allow the connectors 32 and 36 to be accessed from behind, when the cockpit is locked.

In concrete terms, the gap D1 is equal to or smaller than 40 mm, and preferably equal to or smaller than 30 mm. It is generally known that the connectors 32 and 36 can be accessed from behind (can be operated by inserting a hand, fingers, or a tool) when the gap D1 is equal to or larger than 42 mm. In the present embodiment, as described above, the gap D1 is equal to or smaller than 40 mm, and preferably equal to or smaller than 30 mm, so the connectors 32 and 36 cannot be physically accessed from behind.

Besides, when the side door on the driver seat side is released from being locked (unlocked) through the operation of the smart key, the locking by the seat lock mechanism 40 is canceled through the control performed by the control device 30. The seat cushion 14 is configured to automatically move to an original position thereof (to rise and slide backward), and the seat back 16 is configured to be automatically inclined backward to an original posture thereof at this time.

FIG. 4 also shows a gap D2 along the substantially vertical direction between the lower surface 14D of the seat cushion 14 and the upper surface 28U of the seat frame 28 at this time. The automobile antitheft device 10 according to the present embodiment prevents the automobile from being stolen, by setting the gap D2 equal to the gap D1.

Next, the operation of the automobile antitheft device 10 according to the present embodiment configured as described above will be described.

When the passenger (e.g., the driver) locks the side door on the driver seat side of the automobile through the operation of the smart key, the seat 12 automatically moves forward, falls, and inclines forward through the control performed by the control device 30 that has detected that the side door is locked. That is, the seat cushion 14 slides to the frontmost position, falls to the lowermost position, and is locked at that position by the seat lock mechanism 40. The seat back 16 then inclines forward to the most forward inclined position, and is locked at that position (in that posture) by the seat lock mechanism 40.

The gap D1 between the lower surface 14D of the seat cushion 14 and the seat frame 28 is set as a gap that does not allow the connectors 32 and 36 arranged below the seat cushion 14 and further forward than the seat frame 28 to be accessed from behind, when the cockpit is locked as in this case.

Accordingly, a thief who attempts to steal the automobile cannot attack the connectors 32 and 36 from behind the seat 12. That is, the gap D1 does not physically allow the connectors 32 and 36 to be operated by inserting the hand or fingers or inserting a tool. In consequence, the automobile can be more reliably prevented from being stolen.

Furthermore, as described above, the seat cushion 14 slides to the frontmost position and falls to the lowermost position when the cockpit is locked. Accordingly, the gap D1 can be made smaller than in the case where the seat cushion 14 neither slides to the frontmost position nor falls to the lowermost position when the cockpit is locked. In consequence, an attack against the connectors 32 and 36 from behind can be made impossible more reliably.

Incidentally, in concrete terms, the gap D1 is equal to or smaller than 40 mm, and preferably equal to or smaller than 30 mm. Accordingly, an attack against the connectors 32 and 36 from behind can be made impossible more reliably than in the case where the gap D1 is larger than 40 mm.

Besides, the shield 17 provided outside the seat cushion 14 that has fallen to the lowermost position in the seat width direction overlaps with the outer side of the lower rail 22 in the seat width direction in a lateral view.

Accordingly, an attack against the connectors 32 and 36 from outside in the seat width direction (from the side door side) can also be made impossible more reliably than in the case where the lower surface of the shield 17 as the outer end portion of the seat cushion 14 that has fallen to the lowermost position in the seat width direction has only reached, for example, the upper surface 22U of the lower rail 22 in a lateral view. Incidentally, an attack against the connectors 32 and 36 from the center console side is physically impossible due to the presence of the center console.

Besides, in the present embodiment, the connector 32 is the connector of the control device 30 equipped with the memory that stores the position and posture of the seat cushion 14 in driving the automobile. Besides, the connector 36 is the connector of the slide motor 34 that automatically slides the upper rails 24.

Accordingly, since the connectors 32 and 36 cannot be accessed, a thief who attempts to steal the automobile absolutely cannot return the seat 12 to the original position and posture thereof (the position and posture that allow the automobile to be driven). As described hitherto, with the automobile antitheft device 10 according to the present embodiment, the automobile can be more reliably prevented from being stolen.

The automobile antitheft device 10 according to the present embodiment has been described above based on the drawings. However, the automobile antitheft device according to the present embodiment is not limited to that shown in the drawings, but can be changed in design as appropriate within such a range as not to depart from the gist of the disclosure. For example, the connector arranged below the seat cushion 14 and further forward than the seat frame 28 may be at least one of the connector 32 of the control device 30 and the connector 36 of the slide motor 34.

Besides, the automobile antitheft device 10 according to the present embodiment may not necessarily be configured to be actuated in response to the locking of the side door on the driver seat side by the smart key. In the case where, for example, the smart key is separately provided with a cockpit lock button or the like, the automobile antitheft device 10 according to the present embodiment may be configured to be actuated by operating the cockpit lock button or the like.

Besides, the automobile antitheft device 10 according to the present embodiment may be configured to be actuated by operating a mobile terminal such as a smartphone instead of the smart key. Furthermore, the automobile antitheft device 10 according to the present embodiment may be configured to be actuated automatically upon the lapse of a predetermined time after extracting an engine key.

What is claimed is:

1. An automobile antitheft device comprising:
   a seat frame installed between a pair of right and left upper rails that are supported by a pair of right and left lower rails provided on a floor of a vehicle interior respectively, slidably in a longitudinal direction of a seat;
   a seat cushion that is supported by the upper rails, that is configured to be able to rise and fall with respect to the upper rails, and that slides forward with respect to the seat while falling when a cockpit is locked; and
   a seat back that is turnably supported by a back side of the seat cushion with respect to the seat, and that inclines forward when the cockpit is locked, wherein
   a gap between a lower surface of the seat cushion and the seat frame is set as a gap that does not allow a connector that is provided below the seat cushion with respect to the seat in front of the seat frame with respect to the seat to be accessed from behind the seat, when the cockpit is locked.

2. The automobile antitheft device according to claim 1, wherein
   the seat cushion slides to a frontmost position and falls to a lowermost position when the cockpit is locked.

3. The automobile antitheft device according to claim 2, wherein
   outer end portions of the seat cushion that has fallen to the lowermost position in a seat width direction overlap with outer sides of the lower rails in the seat width direction, respectively, in a lateral view.

4. The automobile antitheft device according to claim 1, wherein
   the gap is equal to or smaller than 40 mm.

5. The automobile antitheft device according to claim 1, wherein
   the connector is at least one of a connector of a slide motor that slides the upper rails and a connector of a control device that stores a position of the seat cushion in driving an automobile.

* * * * *